United States Patent [19]
Yada

[11] Patent Number: 5,114,206
[45] Date of Patent: May 19, 1992

[54] MOUNTING OF WINDOW GLASS PLATE ON VEHICLE BODY PANEL

[75] Inventor: Yukihiki Yada, Nagoya, Japan

[73] Assignee: Tokai Kogyo Kabushiki Kaisha, Oobu, Japan

[21] Appl. No.: 598,196

[22] Filed: Oct. 16, 1990

[30] Foreign Application Priority Data

Oct. 30, 1989 [JP] Japan .................. 1-125667

[51] Int. Cl.⁵ .......................................... B60R 13/06
[52] U.S. Cl. .................... 296/201; 296/93; 52/208
[58] Field of Search .................. 296/201, 93; 52/208, 52/400

[56] References Cited

U.S. PATENT DOCUMENTS

| | | | |
|---|---|---|---|
| 4,757,660 | 7/1988 | Miyakawa et al. | 52/400 |
| 4,840,001 | 6/1989 | Kimisaura | 52/208 |
| 4,884,380 | 12/1989 | Yada et al. | 52/208 |
| 4,950,019 | 8/1990 | Gross | 296/93 |
| 4,968,543 | 11/1990 | Fujioka et al. | 296/93 |
| 4,984,839 | 1/1991 | Miyakawa et al. | 296/93 |

Primary Examiner—Robert R. Song
Attorney, Agent, or Firm—Fleit, Jacobson, Cohn, Price, Holman & Stern

[57] ABSTRACT

Mounting of a window glass plate on a vehicle body panel, wherein the window glass plate is bonded at a peripheral portion thereof to an opening portion of the vehicle body panel. A holding strip member is fitted with an upper edge portion and opposite side edge portions of the window glass plate. A leg portion of a molding is inserted and retained in a groove of the holding strip member. The leg portion has a pawl adapted to engage a projection formed in the groove of the holding strip member. A garnish portion extends from a top of the leg portion of the window glass plate side. Engagement of the pawl of the leg portion with the projection in the groove of the holding strip member provides pressure contact of a rear surface of the garnish portion with a front surface of the window glass plate at the upper edge portion of the window glass plate, while a gap serving as a gutter for allowing flow of water is defined between the rear surface of the garnish portion and the front surface of the window glass plate at each of the side edge portions of the window glass plate.

7 Claims, 7 Drawing Sheets

MOUNTING OF WINDOW GLASS PLATE ON VEHICLE BODY PANEL

BACKGROUND OF THE INVENTION

1. Field of the Invention

The present invention relates to mounting of a window glass plate on a vehicle body panel, and more particularly to mounting of a front window glass plate on an opening portion of a vehicle body.

2. Description of the Prior Art

In mounting a window glass plate on an opening portion of a vehicle body, a weather strip formed of a material such as rubber or synthetic rubber and manufactured by extrusion molding is used between a flange of the opening portion of the vehicle body and a peripheral portion of the window glass plate.

Alternatively, a formed portion consisting of a flange portion and an inclined wall portion is formed at periphery of the opening portion of the vehicle body. On the other hand, a thick tape of adhesive formed of polysulfide or butyl rubber is applied to an overall peripheral portion of the window glass plate. Then, the window glass plate is bonded by the adhesive to the flange portion of the formed portion of the vehicle body. Thereafter, a molding formed of a material such as rubber or synthetic rubber is inserted into a gap defined between the pheripheral edge portion of the window glass plate and the inclined wall portion of the formed portion. The molding serves as a garnish at the mounting portion between the window glass plate and the vehicle body panel, and also serves to prevent water from penetrating into an inside of the vehicle body panel.

JP-U 63-32915 (Japanese KOKAI Utility Model Application) discloses that one side portion of a molding is cut away to form a gutter for allowing flow of water. However, as a width of the side portion of the molding where the gutter is formed is smaller than that of the other portion, an ornamental performance is deteriorated.

JP-U 63-32916 discloses that a gutter for allowing flow of water is additionally formed by injection molding on a molding manufactured by extrusion molding. In this molding, the portion formed by extrusion molding and the portion formed by injection molding are different in appearance, and the manufacturing is difficult.

SUMMARY OF THE INVENTION

It is a primary object of the present invention to provide mounting of a window glass plate on a vehicle body panel, which forms a gutter for allowing flow of water by means of a gap defined between a molding and a front surface of the window glass plate bonded to an opening portion of the vehicle body panel at each of opposite side edge portions of the window glass plate.

According to one aspect of the present invention, a holding strip member is fitted with an upper edge portion and opposite side edge portions of a window glass plate. A stripe of adhesive is applied to a rear surface of an overall peripheral portion of the window glass plate along an outer edge thereof. Thus, the window glass plate with the holding strip member is bonded by the adhesive to an overall peripheral portion of a window opening of a vehicle body panel. Then, a molding is engaged with the holding strip member. The holding strip member is formed with a first groove extending in a longitudinal direction thereof and facing an edge surface of the window glass plate. The edge portion of the window glass plate is inserted in the first groove and maintained in a liquid-tight condition. The holding strip member is further formed with a second groove opening in a direction perpendicular to an opening direction of the first groove and extending in parallel to the outer edge of the window glass plate. The molding is integrally formed with a leg portion adapted to be tightly inserted into the second groove, a garnish portion having a predetermined width and projecting from a top of the leg portion to the window glass plate side, and a seal portion projecting from the top of the leg portion to the vehicle body panel side. A wall of the second groove of the holding strip member is formed with a first projection, and the leg portion of the molding is formed with a second projection adapted to engage the first projection. Engagement of the first projection with the second projection provides liquid-tight pressure contact of a rear surface of the garnish portion with a front surface of the window glass plate at the upper edge portion of the window glass plate, while a gap serving as a gutter for allowing flow of water is defined between the rear surface of the garnish portion and the front surface of the window glass plate at each side edge portion of the window glass plate.

According to another aspect of the present invention, the holding strip member is integrally formed with a stopper projecting from an outer surface thereof at each side edge portion of the window glass plate. The stopper abuts against the rear surface of the garnish portion to thereby surely define the gap as the gutter between the rear surface of the garnish portion and the front surface of the window glass plate.

According to a further aspect of the present invention, the holding strip member is disposed only at each side edge portion of the window glass plate. The second projection of the leg portion of the molding is engaged with the vehicle body panel or an engaging member fixed thereto along the upper edge portion of the window glass plate. The leg portion is further formed with a third projection adapted to engage the rear surface of the window glass plate at the upper edge portion thereof. Engagement of the third projection with the rear surface of the window glass plate provides pressure contact of the rear surface of the garnish portion with the front surface of the window glass plate.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein.

DETAILED DESCRIPTION OF THE PREFERRED EMBODIMENTS

Figure 1:
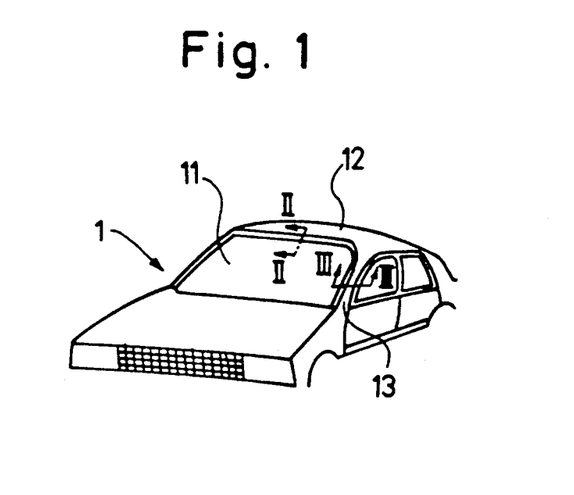
FIG. 1 is a perspective view of a front part of an automobile to which the present invention is applicable.

Referring to FIG. 1, reference numeral 1 generally designates an automobile having a window glass plate 11, a roof panel 12 and a pair of right and left front pillars 13. The window glass plate 11 is mounted to a front opening of a vehicle body of the automobile 1 by utilizing a formed portion formed at a front edge of the roof panel 12 and at opposed inside edges of the front pillars 13. More specifically, an upper edge of the window glass plate 11 is bonded by adhesive to the front edge of the roof panel 12, and right and left side edges of the window glass plate 11 are bonded by adhesive to the opposed inside edges of the front pillars 13. Further, a lower edge of the window glass plate 11 is bonded to a vehicle body panel such as a cowl top.

Figure 2:
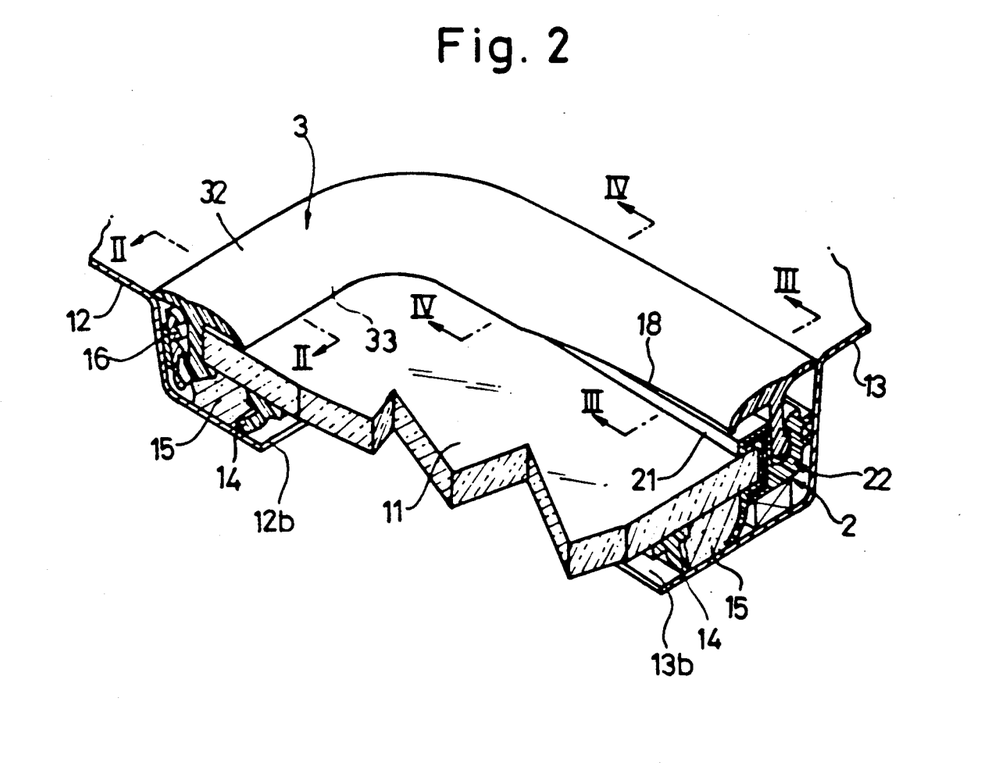
FIG. 2 is a perspective view of an essential part of a first preferred embodiment of the present invention.
Figure 3:
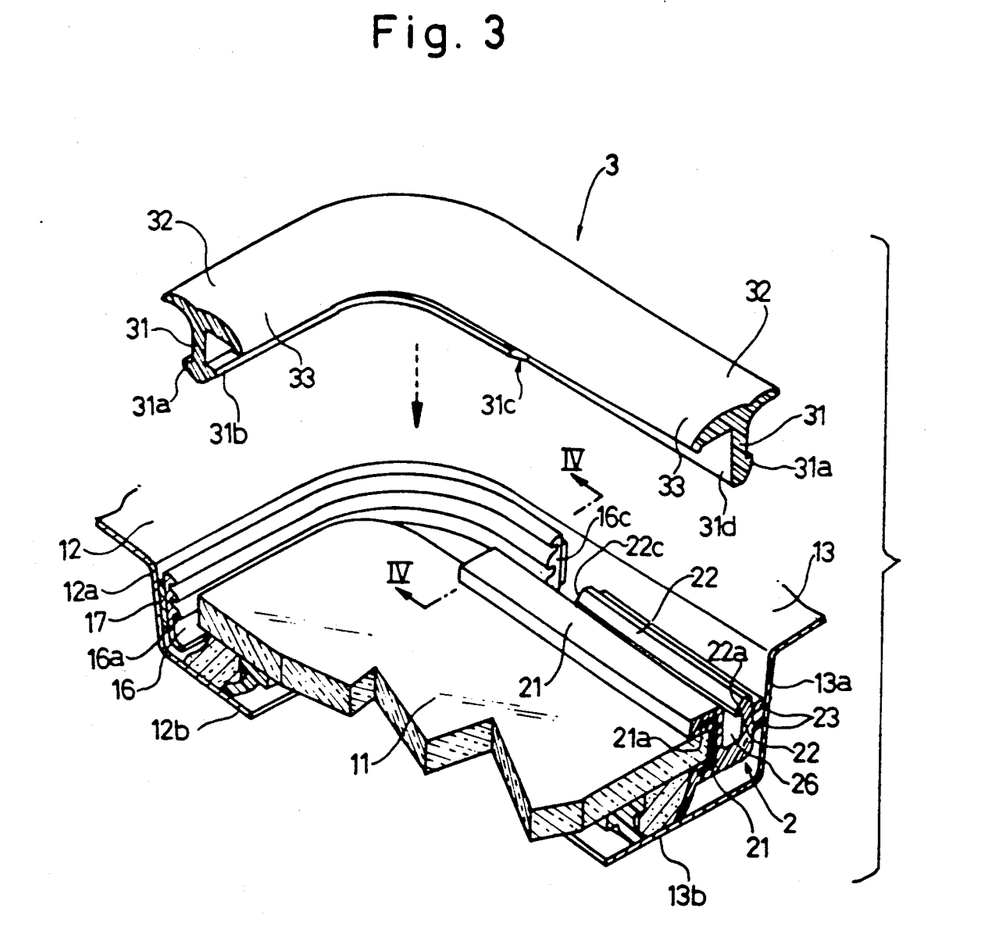
FIG. 3 is a view similar to FIG. 2, showing a detailed structure of the first preferred embodiment.

FIGS. 2 to 6 show a first preferred embodiment of the present invention. Referring to FIGS. 2 and 3 which show a mounting structure of one of corner portions of the window glass plate 11, the formed portion to be formed at the window opening of the vehicle body panel is constructed in such a manner that the front edge of the roof panel 12 is formed with an inclined wall portion 12a and a flange portion 12b for mounting the upper edge of the window glass plate 11, and that the inside edge of each front pillar 13 is formed with an inclined portion 13a and a flange portion 13b for mounting the side edge of the window glass plate 11.

As shown in FIG. 3, a molding engaging member 16 formed of an elastic material such as rubber or synthetic resin is bonded by a double-coated adhesive tape 17 to the inclined wall portion 12a of the roof panel 12 and a part of the inclined wall portion 13a of the front pillar 13 near the corner formed between the inclined wall portion 12a and the inclined wall portion 13a. Three elongated projections 16a are formed on a surface of the engaging member 16 on the opposite side of the adhesive tape 17 so as to extend in a longitudinal direction of the engaging member 16. An end 16c of the engaging member 16 is disposed on the inclined wall portion 13a of the front pillar 13 at a position near the corner between the roof panel 12 and the front pillar 13. Although not shown, the other end of the engaging member 16 is similarly disposed. A holding strip member 2 is mounted on the side edge of the window glass plate 11 so as to be interposed between the same and the inclined wall portion 13a of the front pillar 13. Although not shown, the same holding strip member as the member 2 is mounted on the other side edge of the window glass plate 11 in the same manner as the above.

The holding strip member 2 is formed of an elastic material such as synthetic rubber or synthetic resin, and it is manufactured by extrusion molding or injection molding. The holding strip member 2 has a window glass holding portion 21 on an inside surface, the side of the window glass plate 11 and a molding holding portion 22 on a front surface, the side of the front pillar 13.

The window glass holding portion 21 is formed with a U-shaped groove 21a for engaging the side edge of the window glass plate 11. That is, the side edge of the window glass plate 11 is inserted in the groove 21a, and is maintained in liquid-tight condition therein. The molding holding portion 22 is formed with a groove 26 for engaging a leg portion 31 of a molding 3 which will be hereinafter described. An elongated projection 22a is formed at an opening of the groove 26 so as to project thereinto and extend in a longitudinal direction of the holding strip member 2. Two tongue-like body lips 23 are formed on an outside surface of the molding holding portion 22 on the opposite side of the groove 26 so as to project toward the inclined wall portion 13a of the front pillar 13 and extend in the longitudinal direction of the holding strip member 2. As best seen in FIG. 3, the window glass holding portion 21 has a length such that when the holding strip member 2 is mounted on the side edge of the window glass plate 11, an end portion of the holding portion 21 overlaps the end 16c of the engaging member 16. On the other hand, the molding holding portion 22 has a length such that when the holding strip member 2 is mounted on the side edge of the window glass plate 11, an end 22c of the molding holding portion 22 is spaced from the end 16c of the engaging member 16.

The molding 3 is formed of an elastic material such as rubber, synthetic rubber or synthetic resin, and it is manufactured by a suitable molding process such as extrusion molding or injection molding. The molding 3 has a substantially T-shaped cross section, and it is integrally formed with the leg portion 31, a seal portion 32 extending from a top of the leg portion 31 to the vehicle body panel side, and a garnish portion 33 extending from the top of the leg portion 31 to the window glass plate 11 side.

The leg portion 31 is formed at its lower end with an engaging pawl 31a and a glass holding pawl 31b projecting in opposite directions. However, the glass holding pawl 31b is formed in a part of the leg portion 31 ranging from an upper portion thereof corresponding to the upper edge of the window glass plate 11 to an end 31c to be disposed near the corner of the window glass plate (the other end being similarly disposed), while the glass holding pawl 31b is not formed in the other part of the leg portion 31 ranging from the end 31c to a side portion corresponding to each side edge of the window glass plate 11, but a flat portion 31d is formed in this range.

Figure 4:
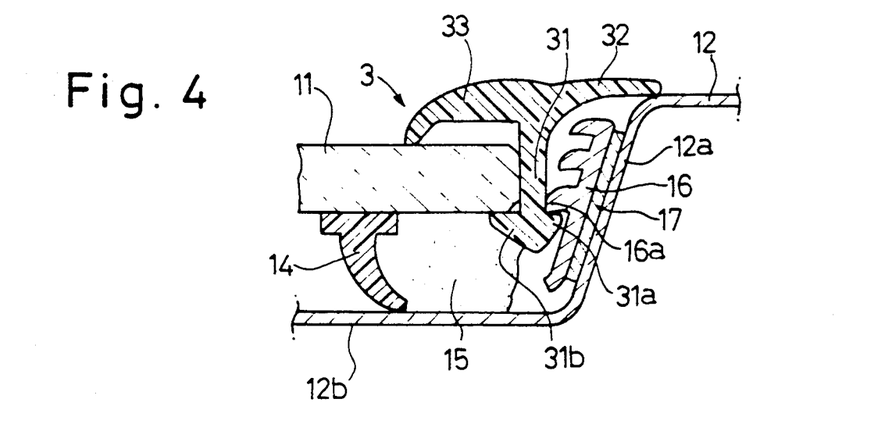
FIG. 4 is a cross section taken along the line II—II in FIG. 2.

Referring to FIG. 4 which is a cross section taken along the line II—II in FIG. 2, the window glass plate 11 is fixed to the flange portion 12b of the roof panel 12 by a rubber dam 14 and a stripe of protuberant adhesive 15 applied by a flow gun. The leg portion 31 of the molding 3 is press-fitted with a gap defined between the window glass plate 11 and the engaging member 16 fixed by the double-coated adhesive tape 17 to the inclined wall portion 12a of the roof panel 12. Further, the glass holding pawl 31b formed at the lower end of the leg portion 31 is engaged with a rear surface of the window glass plate 11. Simultaneously, the engaging pawl 31a formed at the lower end of the leg portion 31 comes into engagement with a lowermost one of the projections 16a of the engaging member 16. In this condition, the seal portion 32 of the molding 3 extending onto the roof panel 12 is in close contact with an upper surface of the roof panel 12 to effect sealing, while the garnish portion 33 of the molding 3 extending onto the window glass plate 11 is also in close contact with a front surface of the window glass plate 11 to thereby hold the window glass plate 11 in cooperation with the glass holding pawl 31b.

Figure 5:
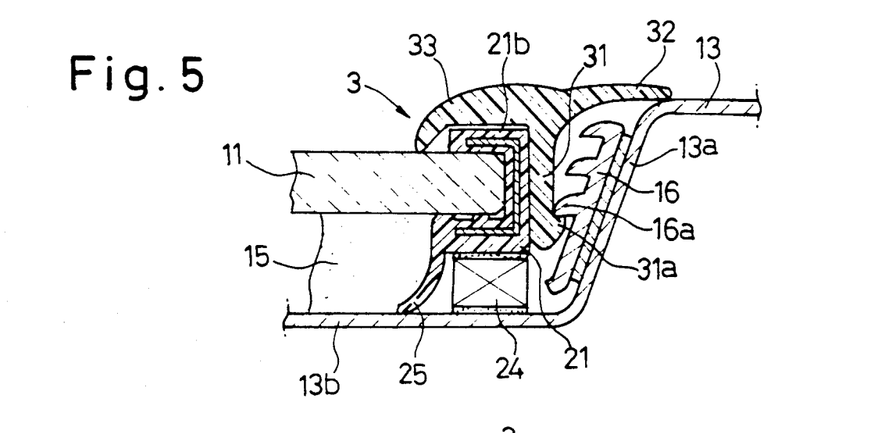
FIG. 5 is a cross section taken along the line IV—IV in FIG. 2.

Referring to FIG. 5 which is a cross section taken along the line IV—IV in FIGS. 2 and 3, the side edge of the window glass plate 11 is engaged with the groove 21a of the window glass holding portion 21 of the holding strip member 2. However, as shown in FIG. 3, the molding holding portion 22 of the holding strip member 2 is not present at this sectional position since it is cut at the end 22c. On the other hand, the end 16c of the engaging member 16 is present at this sectional position. Further, the glass holding pawl 31b of the leg portion 31 of the molding 3 is not present at this sectional position.

Under the above condition where the side edge of the window glass plate 11 is held by the window glass holding portion 21 of the holding strip member 2, the window glass plate 11 is further bonded by the adhesive 15 to the flange portion 13b of the front pillar 13. Simultaneously, a double-coated adhesive tape 24 including a foamed soft material at a central portion thereof is interposed between the window glass holding portion 21 and the flange portion 13b to support a lower surface of the window glass holding portion 21. The window glass holding portion 21 is integrally formed with a resilient lip 25 extending downwardly to resiliently contact the flange portion 13b.

The engaging pawl 31a of the leg portion 31 of the molding 3 is engaged with the lowermost projection 16a of the engaging member 16, which projection 16a is disposed at substantially the same level as that of the rear surface of the window glass plate 11. The seal portion 32 of the molding 3 is in close contact with the upper surface of the front pillar 13, while the garnish portion 33 of the molding 3 is also in close contact with the front surface of the window glass plate 11 so as to cover an upper wall 21b of the window glass holding portion 21.

Figure 6:
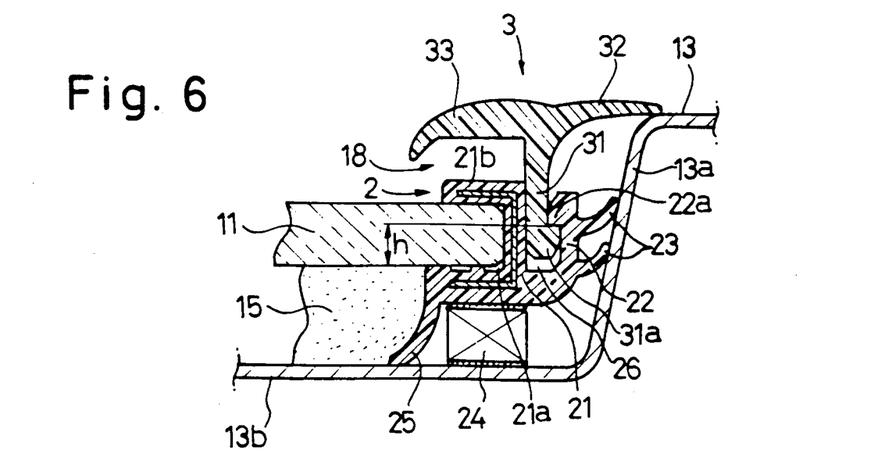
FIG. 6 is a cross section taken along the line III—III in FIG. 2.

Referring to FIG. 6 which is a cross section taken along the line III—III in FIG. 2, the side edge of the window glass plate 11 is engaged with the groove 21a of the window glass holding portion 21 of the holding strip member 2, the window glass plate 11 is bonded to the flange portion 13b of the front pillar 13 by the adhesive and the holding strip member 2 is fixed to the flange portion 13b of the front pillar 13 by the double-coated adhesive tape 24.

The body lips 23 of the molding holding portion 22 of the holding strip member 2 is in resilient contact with the inclined wall portion 13a of the front pillar 13, and the resilient lip 25 of the window glass holding portion 21 is in resilient contact with the flange portion 13b of the front pillar 13.

The leg portion 31 of the molding 3 is in press fit with the groove 26 of the holding strip member 2, and the engaging pawl 31a is in engagement with the projection 22a of the molding holding portion 22. In comparison with the condition at the corner portion as shown in FIG. 5 wherein the engaging pawl 31a of the leg portion 31 is engaged with the lowermost projection 16a disposed at substantially the same level as that of the rear surface of the window glass plate 11, the engaging pawl 31a of the leg portion 31 under the condition at the side portion as shown in FIG. 6 is engaged with the projection 22a disposed at a level h over the rear surface of the window glass plate 11. That is, the side portion of the molding 3 is disposed at a level higher than that of the corner portion of the molding 3 with respect to the rear surface of the window glass plate 11. The inclined portion 13a corresponding to the side portion of the molding 3 is designed to be higher than the inclined portion 13a corresponding to the corner portion of the molding 3 as apparent from FIGS. 5 and 6. Accordingly, the seal portion 32 of the molding 3 extending onto the front pillar 13 is in close contact with the upper surface of the front pillar 13. On the other hand, as the garnish portion 33 of the molding 3 extending onto the window glass plate 11 is disposed at the level h over the front surface of the window glass plate 11, there is defined a gap corresponding to the level h between the garnish portion 33 and the front surface of the window glass plate 11, thereby forming a gutter 18 for allowing flow of water.

As the gutter 18 is formed by the upper wall 21b of the window glass holding portion 21 of the holding strip member 2, the leg portion 31 of the molding 3, and the garnish portion 33 of the molding 3, a high liquid tightness is ensured so that there is no possibility of water penetrating into an inside of the vehicle body panel.

According to the first preferred embodiment as described above, the gutter 18 for allowing flow of water can be formed without working a surface of the molding 3 manufactured by extrusion molding or the like, an ornamental performance can be improved with a high sealability.

The double-coated adhesive tape 24 is used for holding the window glass plate 11 at a predetermined position during a period for hardening of the adhesive 15.

Figure 7:
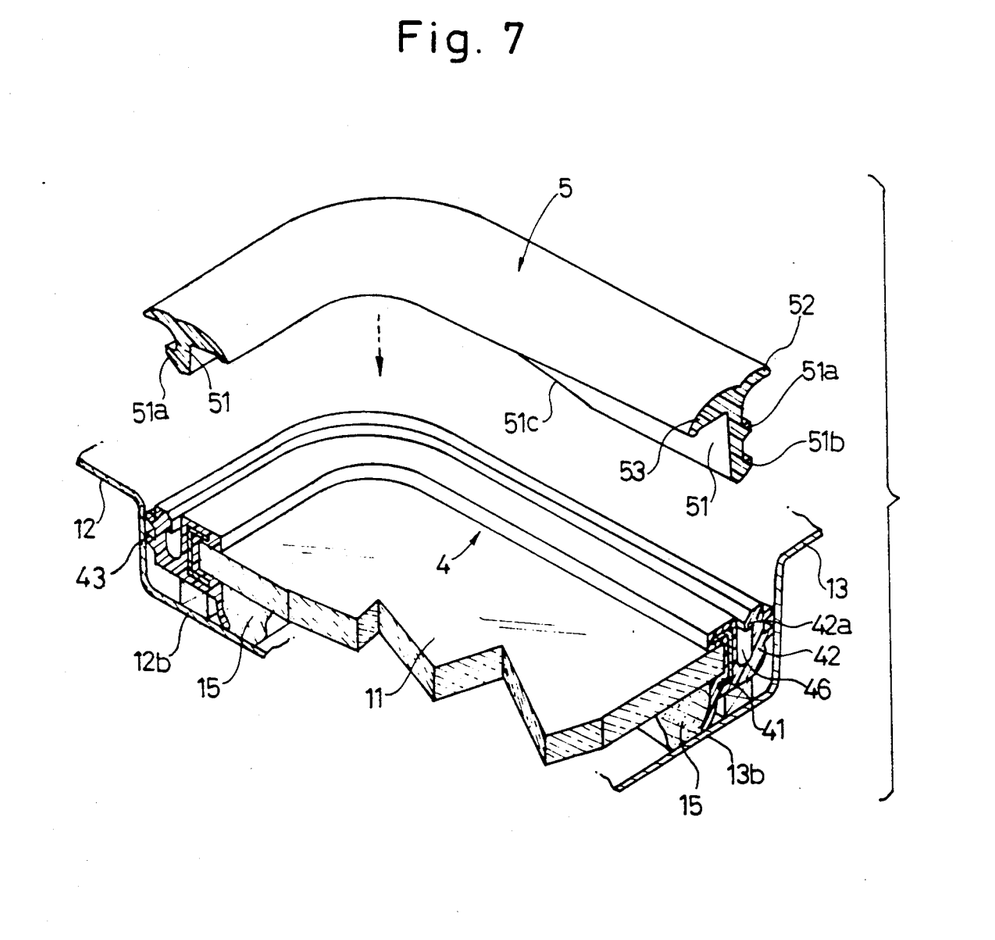
FIG. 7 is a perspective view similar to FIG. 3, showing a second preferred embodiment of the present invention.
Figure 8:
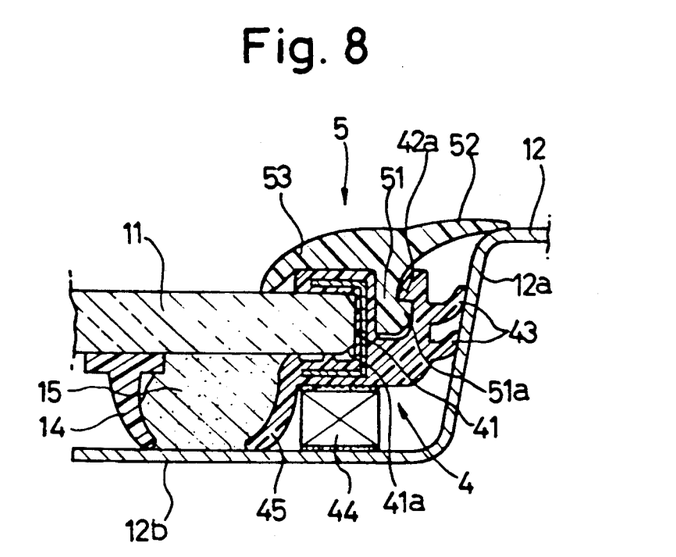
FIG. 8 is a cross section similar to FIG. 4, according to the second preferred embodiment.
Figure 9:
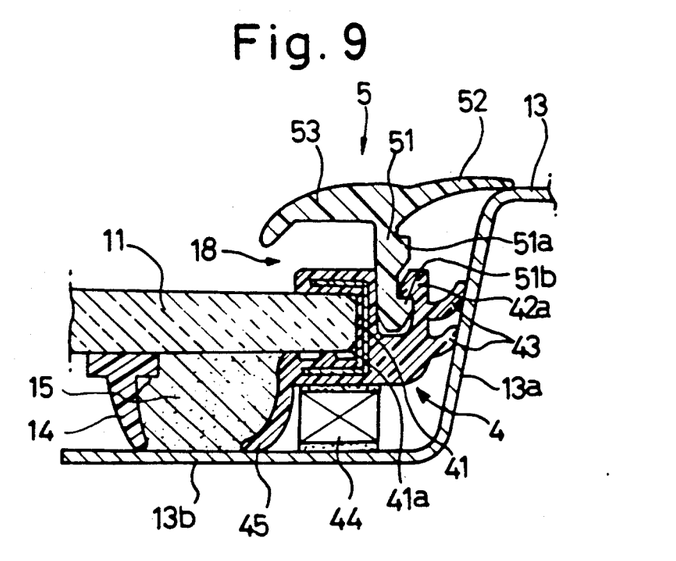
FIG. 9 is a cross section similar to FIG. 6, according to the second preferred embodiment.

There will now be described a second preferred embodiment with reference to FIGS. 7 to 9, in which FIG. 7 is a perspective view similar to FIG. 3, and FIGS. 8 and 9 are sectional views similar to FIGS. 4 and 6, respectively.

The upper edge portion and the opposite side edge portions of the window glass plate 11 are continuously held by a holding strip member 4 having a window glass holding portion 41 and a molding holding portion 42.

The window glass holding portion 41 is formed with a sectional U-shaped groove 41a for engaging the upper and side edge portions of the window glass plate 11. That is, the upper and side edge portions of the window glass plate 11 is inserted in the groove 41a and is maintained in liquid-tight condition therein. The window glass holding portion 41 is further formed with a resilient lip 45 (FIGS. 8 and 9) extending to the flange portions 12b and 13b and resiliently contacting therewith.

The molding holding portion 42 is formed with a groove 46 for engaging a leg portion 51 of a molding 5 and with a projection 42a at an opening of the groove 46. The molding holding portion 42 is further formed with two body lips 43 projecting to the inclined wall portions 12a and 13a and resiliently contacting therewith.

The molding 5 has a substantially T-shaped cross section such that it is integrally formed with the leg portion 51, a seal portion 52 extending from a top of the leg portion 51 to the vehicle body panel side, and a garnish portion 53 extending from the top of the leg portion 51 to the window glass plate 11 side. The leg portion 51 is formed with two engaging pawls 51a and 51b extending in the longitudinal direction of the molding 5 on the side of the seal portion 52. While the two engaging pawls 51a and 51b are formed at a part of the leg portion 51 corresponding to a primary part of the side edge portion of the window glass plate 11, the engaging pawl 51b is not formed at the other part of the leg portion 51 corresponding to the upper edge portion and the corner portion of the window glass plate 11. That is, a height of the leg portion 51 is gradually increased from the corner portion to the side portion by forming a tapering portion 51c therebetween.

An assembly of the window glass plate 11 and the holding strip member 4 is bonded to the flange portion 12b of the roof panel 12 and the flange portion 13b of the front pillar 13 by using the adhesive 15. A double-coated adhesive tape 44 is interposed between the assembly and the flange portions 12b and 13b to support the lower surface of the window glass holding portion 41 of the holding strip member 4 for holding the window glass plate 11 at a predetermined position during a period for hardenng of the adhesive 15.

Under the bonded condition of the assembly, the body lips 43 of the holding strip member 4 are in resilient contact with the inclined wall portion 12a of the roof panel 12 and the inclined wall portion 13a of the front pillar 13. Simultaneously, the resilient lip 45 of the holding strip member 4 is in resilient contact with the flange portion 12b of the roof panel 12 and the flange protion 13b of the front pillar 13.

When the leg portion 51 of the molding 5 is press-fitted with the groove 46 of the holding strip member 4, the engaging pawl 51a of the leg portion 51 comes into engagement with the projection 42a of the molding holding portion 42, and the garnish portion 53 of the molding 5 comes into contact with the window glass holding portion 41 at the upper edge portion of the window glass plate 11 as shown in FIG. 8 since the height of the leg portion 51 at this portion is relatively small as previously mentioned. The garnish portion 53 also contacts the front surface of the window glass plate 11, and the seal portion 52 of the molding 5 is in close contact with the upper surface of the roof panel 12.

On the other hand, at the primary part of the side edge portion of the window glass plate 11, the engaging pawl 51b of the leg portion 51 comes into engagement with the projection 42a of the molding holding portion 42, and the garnish portion 53 does not contact the window glass holding portion 41 and the window glass plate 11 to define a gap serving as the gutter 18 as shown in FIG. 9 since the height of the leg portion 51 at this portion is relatively large as previously mentioned.

Although the two upper and lower engaging pawls 51a and 51b are formed at the part of the leg portion 51 corresponding to the primary part of the side edge portion of the window glass plate 11 in this preferred embodiment, it is to be apparently understood from FIG. 9 that the upper engaging pawl 51a may be eliminated since it is disposed outside the holding strip member 4 at this portion where the gutter 18 is formed.

Thus, the gutter 18 for allowing flow of water can be formed simply with a good sealability and ornamental performance.

Figure 10:
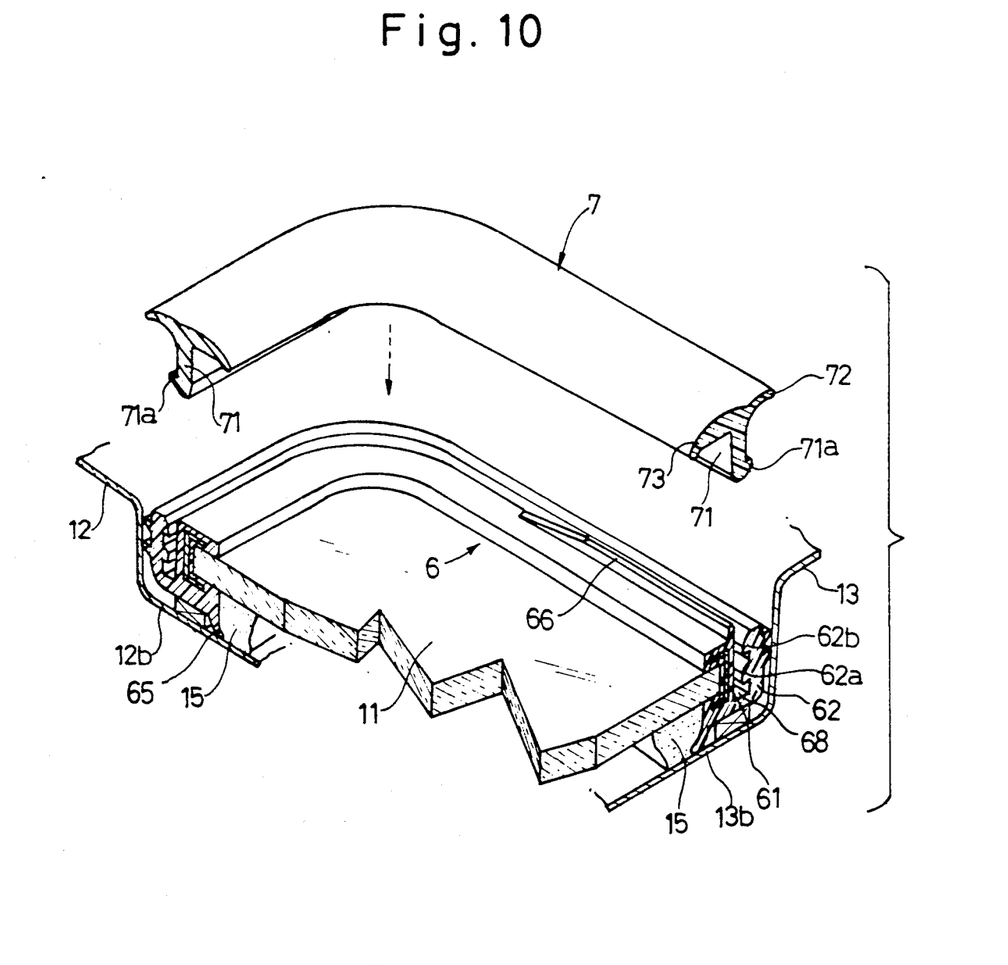
FIG. 10 is a perspective view similar to FIG. 3, showing a third preferred embodiment of the present invention.
Figure 11:
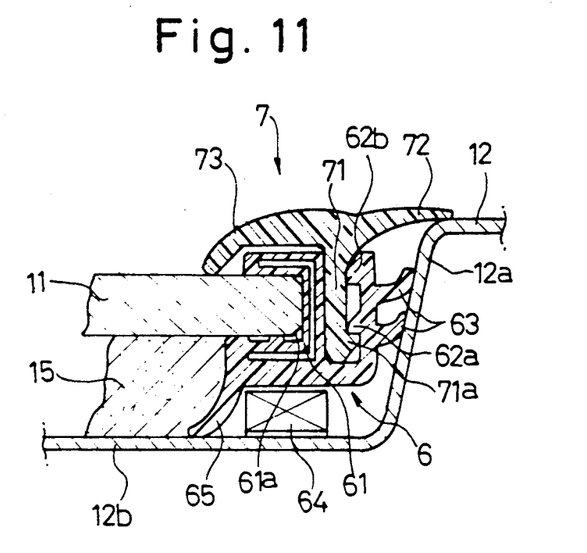
FIG. 11 is a cross section similar to FIG. 4, according to the third preferred embodiment.
Figure 12:
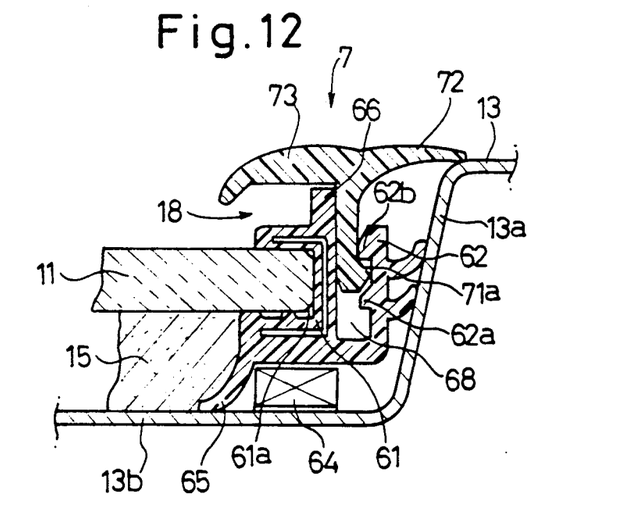
FIG. 12 is a cross section similar to FIG. 6, according to the third preferred embodiment.

There will now be described a third preferred embodiment with reference to FIGS. 10 to 12, in which FIG. 10 is a perspective view similar to FIG. 3, and FIGS. 11 and 12 are sectional views similar to FIGS. 4 and 6, respectively.

The upper edge portion and the opposite side edge portions of the window glass plate 11 are continuously held by a holding strip member 6 having a window glass holding portion 61 and a molding holding portion 62.

The window glass holding portion 61 is formed with a sectional U-shaped groove 61a for engaging the upper and side edge portions of the window glass plate 11. That is, the upper and side edge portions of the window glass plate 11 is inserted in the groove 61a and is maintained in liquid-tight condition therein. The window glass holding portion 61 is further formed with a resilient lip 65 extending to the flange portions 12b and 13b and resilient contacting therewith.

The molding holding portion 62 is formed with a groove 68 for engaging a leg portion 71 of a molding 7 and with two projections 62a and 62b projecting from one of inner wall surfaces of the groove 68 and extending in the longitudinal direction of the holding strip member 6. The molding holding portion 62 is further formed with two body lips 63 projecting to the inclined wall portions 12a and 12a and resiliently contacting therewith.

Furthermore, at a part of the window glass holding portion 61 corresponding to a primary part of the side edge portion of the window glass plate 11, a stopper 66 is formed on a front surface of the window glass holding portion 61 so as to project in perpendicular relationship to the front surface of the window glass plate 11 and extend in parallel relationship to the groove 68.

The molding 7 has a substantially T-shaped cross section such that it is integrally formed with the leg portion 71, a seal portion 72 extending from a top of the leg portion 71 to the vehicle body panel side, and a garnish portion 73 extending from the top of the leg portion 71 to the window glass plate 11 side. The leg portion 71 is formed at its lower end with an engaging pawl 71a extending in the longitudinal direction of the molding 7 on the side of the seal portion 72.

An assembly of the window glass plate 11 and the holding strip member 6 is bonded to the flange portion 12b of the roof panel 12 and the flange portion 13b of the front pillar 13 by using the adhesive 15. A double-coated adhesive tape 64 is interposed between the assembly and the flange portions 12b and 13b to support the lower surface of the window glass holding portion 61 of the holding strip member 6.

Under the bonded condition of the assembly, the body lips 63 of the holding strip member 6 are in resilient contact with the inclined wall portion 12a of the roof panel 12 and the inclined wall portion 13a of the front pillar 13. Simultaneously, the resilient lip 65 of the holding strip member 6 is in resilient contact with the flange portion 12b of the roof panel 12 and the flange portion 13b of the front pillar 13.

When the leg portion 71 of the molding 7 is press-fitted with the groove 68 of the holding strip member 6, the lower end of the leg portion 71 reaches a bottom of the groove 68, and the engaging pawl 71a of the leg portion 71 comes into engagement with the lower projection 62a of the molding holding portion 62 at the upper edge portion of the window glass plate 11 as shown in FIG. 11. Under the condition, the seal portion 72 of the molding 7 is in close contact with the upper surface of the roof panel 12, and the garnish portion 73 is also in contact with the front surface of the window glass plate 11.

On the other hand, at the primary part of the side edge portion of the window glass plate 11, the garnish portion 73 is in abutment against an upper end of the stopper 66 projecting upwardly from the front surface of the window glass holding portion 61 of the holding strip member 6. Therefore, the leg portion 71 of the molding 7 is limitedly inserted in the groove 68 to a middle position thereof, and the engaging pawl 71a comes into engagement with the upper projection 62b of the molding holding portion 62. Accordingly, as shown in FIG. 12, there is defined a gap between the garnish portion 73 and the window glass holding portion 61 to form the gutter 18.

Thus, the gutter 18 for allowing flow of water can be formed simply with a good sealability and ornamental performance.

According to the present invention as described above, the window glass plate is reliably held in the U-shaped groove of the window glass holding portion, and the leg portion of the molding is reliably held in the groove of the molding holding portion by the engagement of the engaging pawl of the leg portion with the projection formed on the inner wall surface of the groove. The holding strip member is so disposed as to correspond to the side edge portion of the window glass plate, or an engagement length of the leg portion of the molding with respect to the groove of the molding holding portion is changed. Accordingly, when the molding is brought into engagement with the holding strip member, the gutter for allowing flow of water is automatically formed between the molding and the holding strip member at the side edge portion of the window glass plate.

As the gutter is reliably sealed by the molding and the holding strip member, there is no possibility of water penetrating into the inside of the vehicle body panel.

What is claimed is:

1. Mounting of a window glass plate on a vehicle body panel, comprising:
   a formed portion formed at a peripheral portion of a window opening of said vehicle body panel for mounting said window glass plate having a size larger than that of said window opening;
   a stripe of protuberant adhesive applied to a rear surface of an overall peripheral portion of said window glass plate along an outer edge thereof;
   an unitary holding strip member extending along an upper edge portion and opposite side edge portions of said window glass plate, said holding strip member having an unitary first groove for engaging said upper and opposite side edge portions of said window glass plate and maintaining a water-tight condition, said first groove opening to face an edge surface of said window glass plate, said holding strip member further having an unitary second groove opening in a direction perpendicular to an opening direction of said first groove and extending in parallel to said edge surface of said window glass plate, said second groove being formed with a first projection which projects inward from an inner wall surface of said second groove; and
   a molding extending along said upper edge portion and said opposite side edge portions of said window glass plate, said molding including a leg portion adapted to be tightly inserted into said second groove of said holding strip member, a garnish portion projecting from a top of said leg portion to said window glass plate and having a predetermined width, and a seal portion projecting from said top of said leg portion to said vehicle body panel, said leg portion having at least one second projection adapted to engage said first projection;
   whereby when said peripheral portion of said window glass plate is bonded by said adhesive to said formed portion, a part of said garnish portion of said molding at said upper edge portion of said window glass plate is in liquid-tight close contact with a front surface of said window glass plate, and the remaining primary part of said garnish portion at each of said opposite side edge portions is spaced from said front surface of said window glass plate to define a gap serving as a gutter for allowing flow of water.

2. The mounting of said window glass plate as defined in claim 1, wherein a distance between said garnish portion and said second projection of said molding at said upper edge portion of said window glass plate is maintained at a predetermined value, and a distance between said garnish portion and said second projection of said molding at each of said opposite side edge portions of said window glass plate is gradually increased from said predetermined value as a distance from a corner portion between said upper edge portion and each of said side edge portions becomes greater.

3. Mounting of a window glass plate on a vehicle body panel, comprising:
   a formed portion formed at a peripheral portion of a window opening of said vehicle body panel for mounting said window glass plate having a size larger than that of said window opening;
   a stripe of protuberant adhesive applied to a rear surface of an overall peripheral portion of said window glass plate along an outer edge thereof;
   an unitary holding strip member extending along an upper edge portion and opposite side edge portions of said window glass plate, said holding strip member having an unitary first groove for engaging said upper and opposite side edge portions of said window glass plate and maintaining a water-tight condition, said first groove opening to face an edge surface of said window glass plate, said holding strip member further having an unitary second groove opening in a direction perpendicular to an opening direction of said first groove and extending in parallel to said edge surface of said window glass plate, said second groove being formed with a first projection which projects inward from an inner wall surface of said second groove, said holding strip member further having a stopper projecting from an outer surface thereof in said opening direction of said second groove; and
   a molding extending along said upper edge portion and said opposite side edge portions of said window glass plate, said molding including a leg portion adapted to be tightly inserted into said second groove of said holding strip member, a garnish portion projecting from a top of said leg portion to said window glass plate and having a predetermined width, and a seal portion projecting from said top of said leg portion to said vehicle body panel, said leg portion having at least one second projection adapted to engage said first projection;
   whereby when said peripheral portion of said window glass plate is bonded by said adhesive to said formed portion, a part of said garnish portion of said molding at said upper edge portion of said window glass plate is in liquid-tight close contact with a front surface of said window glass plate, and the remaining primary part of said garnish portion at each of said opposite side edge portions is spaced from said front surface of said window glass plate to define a gap serving as a gutter for allowing flow of water, said gutter having a width corresponding to a height of said stopper.

4. The mounting of said window glass plate as defined in claim 3, wherein said first projection formed in said second groove of said holding strip member comprises at least two projections, and said second projection of said leg portion of said molding projects in parallel to said garnish portion, and said stopper is formed with a tapering portion gradually rising from a position near a corner portion between said upper edge portion and each of said opposite side edge portions and with an abutting portion continued from said tapering portion and abutting against said garnish portion.

5. Mounting of a window glass plate on a vehicle body panel, comprising:
- a formed portion formed at a peripheral portion of a window opening of said vehicle body panel for mounting said window glass plate having a size larger than that of said window opening;
- a strip of protuberant adhesive applied to a rear surface of an overall peripheral portion of said window glass plate along an outer edge thereof;
- two holding strip members extending along opposite side edge portions of said window glass plate, each of said holding strip members having a first groove for engaging said edge portions of said window glass plate and maintaining a water-tight condition, said first groove opening to face an edge surface of said window glass plate, each of said holding strip members further having a second groove opening in a direction perpendicular to an opening direction of said first groove and extending in parallel to said edge surface of said window glass plate, said second groove being formed with a first projection which projects inward from an inner wall surface of said second groove; and
- a molding extending along an upper edge portion and said opposite side edge portions of said window glass plate, said molding including a leg portion adapted to be fixed to said vehicle body panel at said upper edge portion of said window glass plate and to be tightly inserted into said second groove of each of said holding strip members at said opposite side edge portions of said window glass plate, a garnish portion projecting from a top of said leg portion to said window glass plate and having a predetermined width, and a seal portion projecting from said top of said leg portion to said vehicle body panel, said leg portion having at least one second projection adapted to engage said first projection and a third projection adapted to engage a rear surface of said upper edge portion of said window glass plate;
- whereby when said peripheral portion of said window glass plate is bonded by said adhesive to said formed portion, a part of said garnish portion of said molding at said upper edge portion of said window glass plate is in liquid-tight close contact with a front surface of said window glass plate in cooperation with said third projection, and the remaining primary part of said garnish portion at each of said opposite side edge portions is spaced from said front surface of said window glass plate to define a gap serving as a gutter for allowing flow of water by engagement of said first and second projections.

6. Mounting of a window glass plate as defined in claim 5, further comprising
- an engaging member fixed to said formed portion of said vehicle body panel at said upper edge portion of said window glass plate and having a pawl adapted to engage said second projection of said leg portion of said molding.

7. Mounting of a window glass plate as defined in claim 6, wherein said third projection of said leg portion of said molding engages said rear surface of said upper edge portion of said window glass plate, and said second projection of said leg portion of said molding engages both said first projection of said holding strip member and said pawl of said engaging member.

* * * * *